Aug. 17, 1943. C. O. DOHRENWEND 2,327,027
MACHINE FOR STRIPPING RUBBER FROM TREAD LINKS OR THE LIKE
Filed Sept. 25, 1942 4 Sheets-Sheet 1
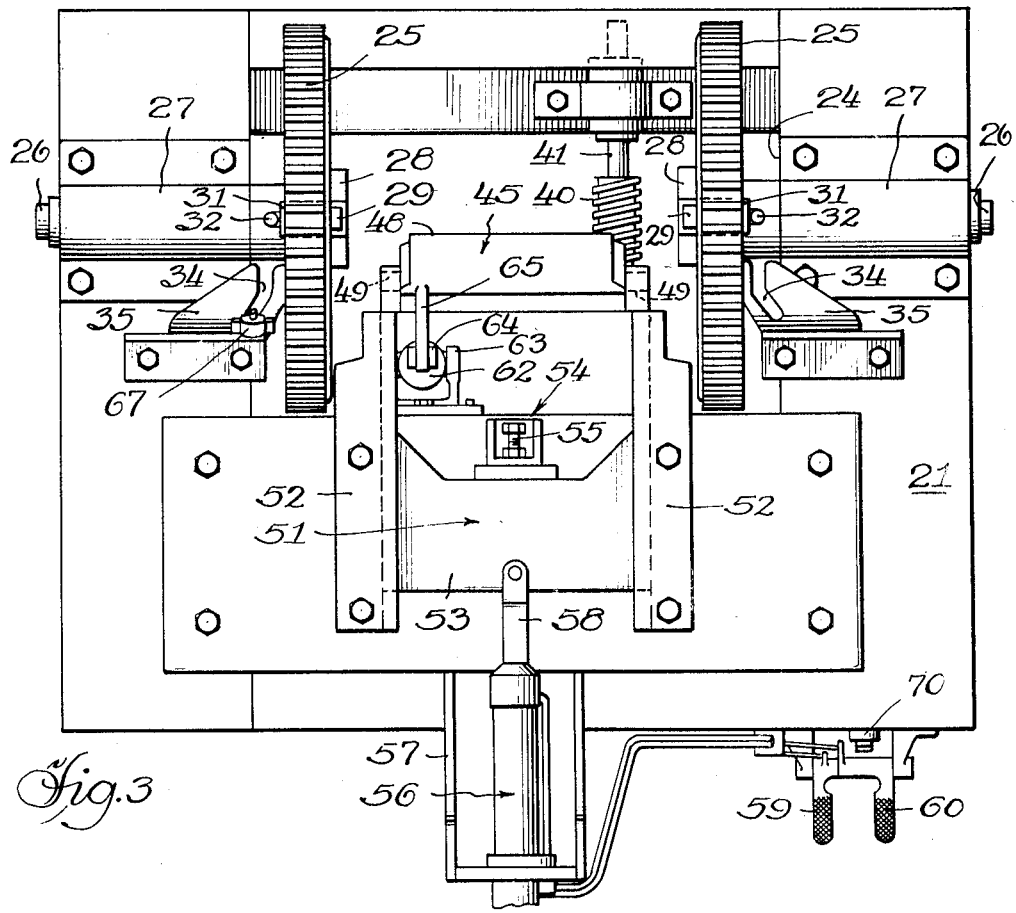
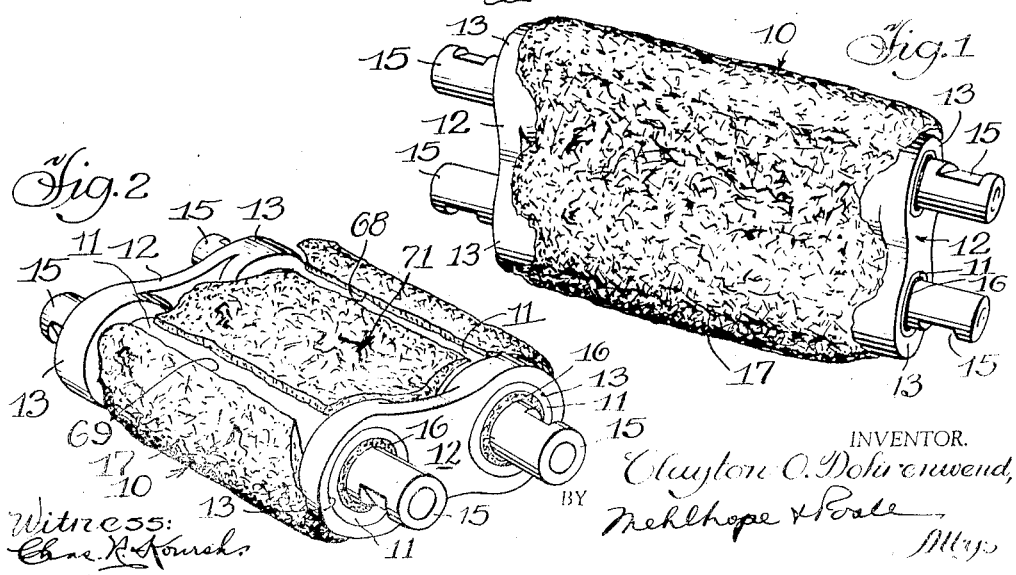

Aug. 17, 1943.  C. O. DOHRENWEND  2,327,027
MACHINE FOR STRIPPING RUBBER FROM TREAD LINKS OR THE LIKE
Filed Sept. 25, 1942  4 Sheets-Sheet 2
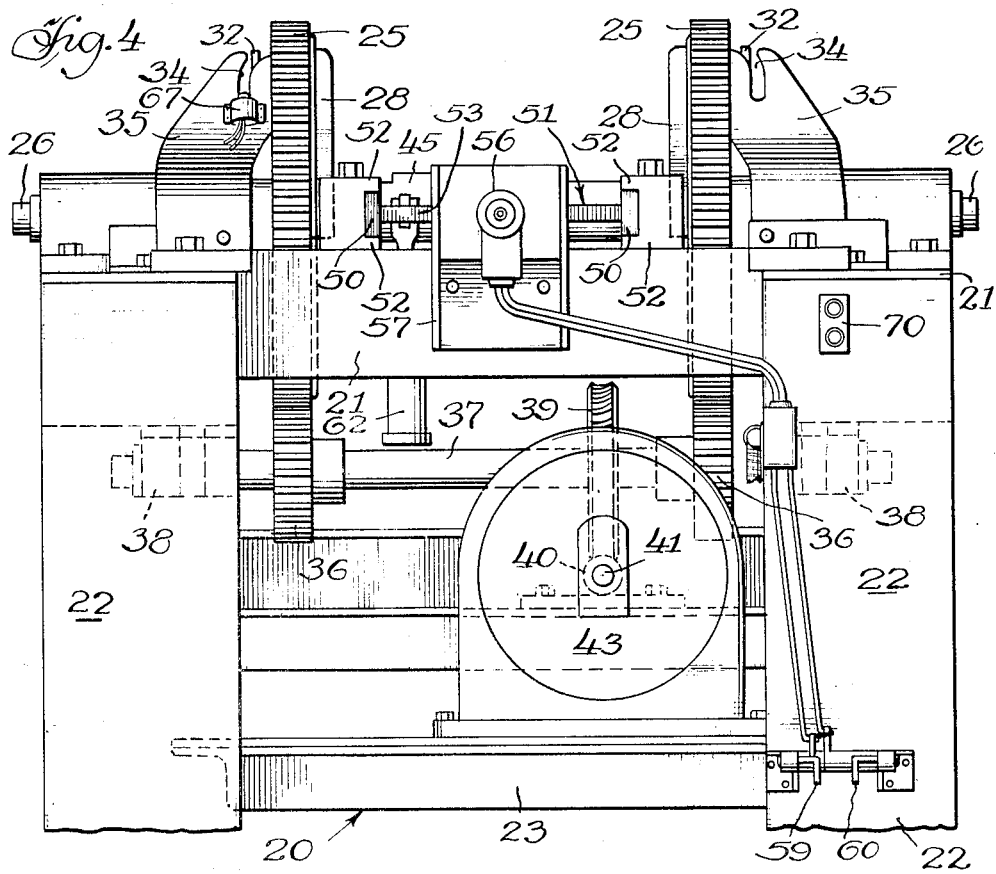
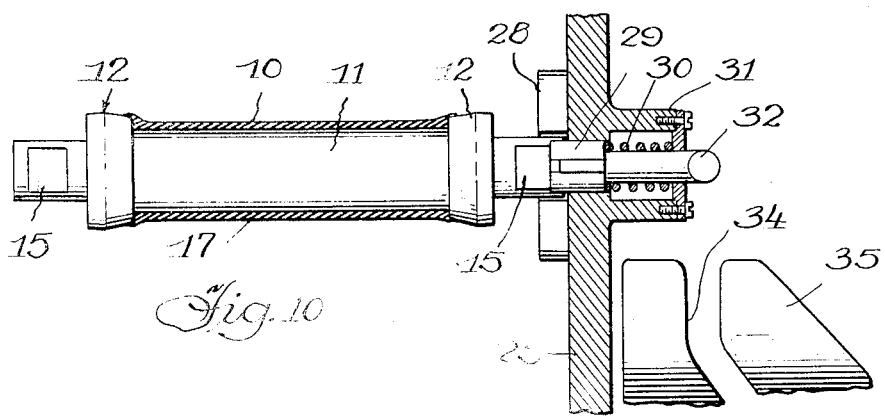

Aug. 17, 1943.  C. O. DOHRENWEND  2,327,027
MACHINE FOR STRIPPING RUBBER FROM TREAD LINKS OR THE LIKE
Filed Sept. 25, 1942  4 Sheets-Sheet 3

INVENTOR.
BY Clayton O. Dohrenwend
Attys.

Witness:

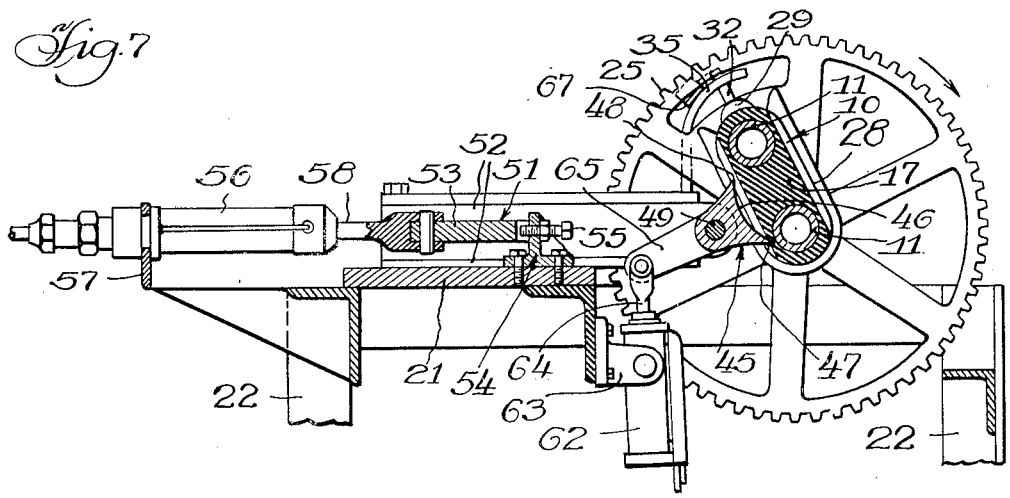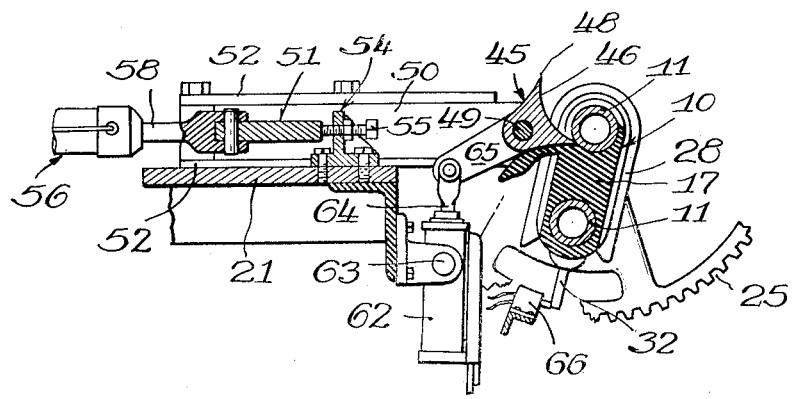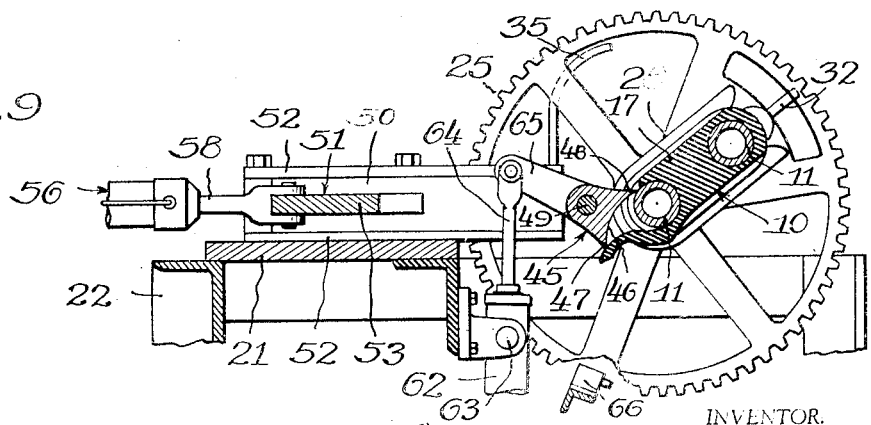

Patented Aug. 17, 1943

2,327,027

UNITED STATES PATENT OFFICE 2,327,027

MACHINE FOR STRIPPING RUBBER FROM TREAD LINKS OR THE LIKE

Clayton O. Dohrenwend, Blue Island, Ill., assignor to Burgess-Norton Mfg. Co., Geneva, Ill., a corporation of Illinois Application September 25, 1942, Serial No. 459,625

12 Claims. (Cl. 164—34)

This invention relates to improvements in machines or apparatus for stripping the rubber from rubber treaded links employed in endless treads for vehicles such as armored war tanks. Such rubber treaded links, as heretofore used on such vehicles, each consists of a rectangular metal frame made up of two tubular pivot members rigidly connected at opposite ends by metal cross members and having a rubber tread molded in a solid block surrounding both tubular pivot members and filling the space between them.

Experience has shown that the tread surfaces of such rubber blocks are subject to such rapid wear and deterioration when in use that it is frequently desirable to salvage and recondition the metal frames thereof for further use, either by applying a new rubber tread block, or, as is now the more common practice, by replacing the rubber tread with metal tread surfaces. To prepare the tread links for such reconditioning, it is necessary to strip or remove the rubber from the metal framework of the link. It has been found extremely difficult to do this either by hand or by machinery because of the peculiar shape of the link, and also the fact that the rubber is extremely tough and resistant to ordinary cutting operations and adheres to the surfaces of the metal framework so as to make its removal very difficult. It has also been proposed to use chemicals or heat as an aid to the stripping operation, but such methods are undesirable because they destroy the usefulness of the rubber bushings or sleeves of resilient rubber which are usually contained within the tubular pivot members of the tread link frames, so as to require the replacement of such rubber bushings, thereby losing valuable rubber, and substantially increasing the cost of reconditioning the tread link.

The principal object of the present invention is to provide an improved form of machine for stripping or removing the rubber from the metal framework of the link in an efficient, rapid and economical manner, and without removing the pivot pins or the rubber bushings from the tubular members of the tread link frames.

The machine of the present invention is particularly adapted for use in connection with a rubber stripping process broadly disclosed and claimed in my co-pending application bearing Serial No. 459,626 filed September 25, 1942, but is not limited to use in such process.

The invention may best be understood by reference to the accompanying drawings, in which Figure 1 shows a perspective view of a tread link of the kind especially adapted for treatment by my improved machine.

Figure 2 shows a perspective view of the tread link after it has been operated upon by the machine.

Figure 3 is a top plan view of a machine embodying the features of my present invention, but with the tread link removed therefrom.

Figure 4 is a front view of the machine shown in Figure 3.

Figure 7 is a fragmentary detail vertical section taken on a vertical plane showing a tread link mounted for stripping operation in the machine, and showing the main operating parts of the latter in their initial position for scarfing the rubber from around one of the tubular members of said tread link frame.

Figure 8 is a detail view somewhat similar to Figure 7, but showing the tread link after it has been rotated in one direction a sufficient distance to perform part of the scarfing operation around one of the tubular pivot members of the frame.

Figure 9 is a sectional detail view somewhat similar to Figures 7 and 8, but showing the position of the parts after the tread link has been rotated in a reverse direction and is in position to complete the scarfing cut around the opposite side of the tubular pivot member.

Figure 10 is an enlarged detail section taken longitudinally of one of the locking pins which hold the tread link in the rotating holding member during the scarfing operation.

Figure 5:
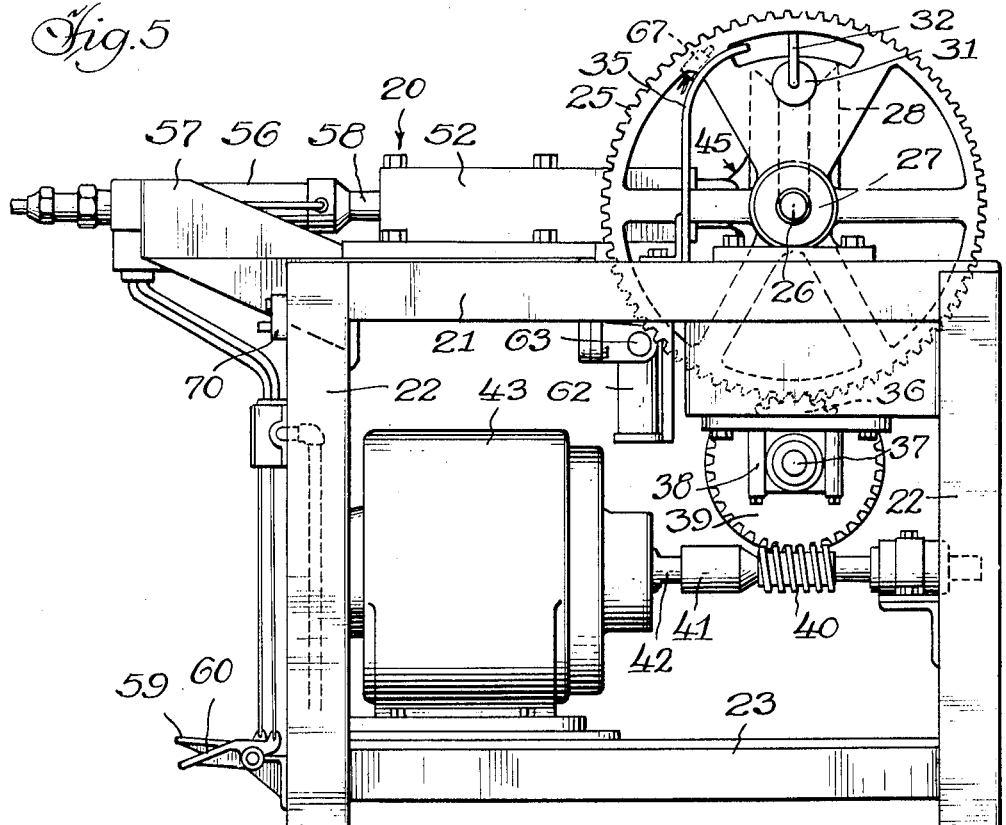
Figure 5 is a side view of the machine shown in Figures 3 and 4.

Referring first to the details of construction of the tread links for which my improved stripping process is particularly designed, one of such tread links indicated at 10, 10 in Figures 1, 2 and 10 is made with a metal base consisting of two tubular pivot members 11, 11 (see Figure 10) in parallel spaced relation to each other and rigidly connected at opposite ends by metal cross members 12, 12 each having eyes 13, 13 at opposite ends thereof in which the metal pivot members are fixed, as by brazing or welding. Pivot pins 15 extend through each of the tubular members 11, 11, and rubber sleeves 16, 16 are interposed between each of said pivot pins 15 and their respective tubular members 11 so as to permit a limited torsional movement of the pivot pins in said tubular members. As the tread link is originally produced, a rubber tread is formed by molding the rubber 17 in a solid block around and between the tubular pivot members 11, 11, said block terminating short of the outer faces of the metal connecting members 12, 12. Figures 1 and 2 show the condition of the rubber block 17 after its treaded surfaces have been worn away by wear to a considerable extent. Although the two tread surfaces are usually reversible, they are subject to such rapid wear that the tread link soon becomes useless and requires salvaging or reconditioning for further use. Owing to the scarcity of rubber, a preferred method of reconditioning now employed consists in replacing the rubber blocks by metal tread surfaces as previously mentioned. But regardless of whether rubber or metal is used for replacement of the tread surfaces, it is desirable to remove all of the rubber from the exterior surfaces of the metal frame of each link without harming or disturbing the resilient rubber bushings 16, 16 within the tubular members 11, 11 and surrounding the pivot pins 15, 15, as previously described. The machine of the present invention is particularly designed for this purpose, and details thereof will now be described.

Figure 6:
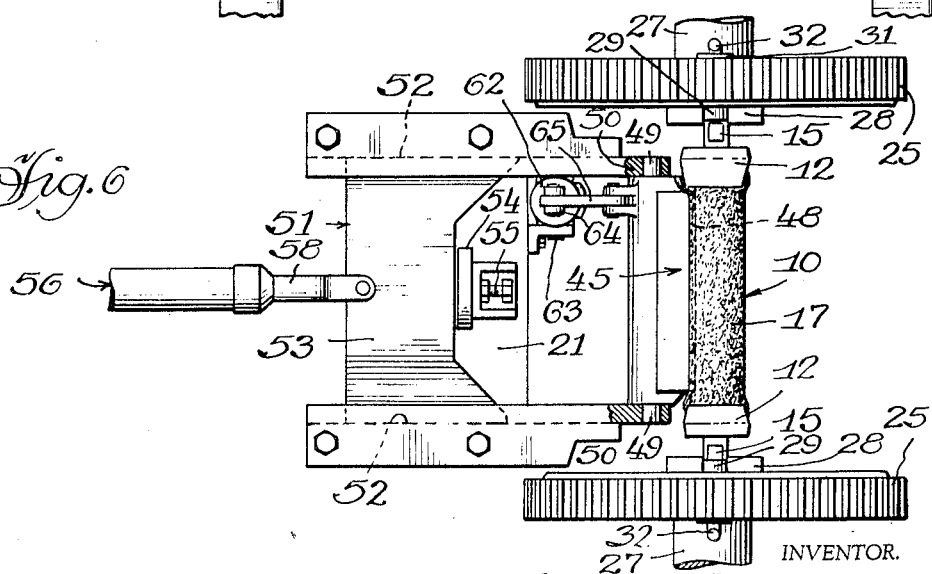
Figure 6 is a fragmentary top plan view of the machine as shown in Figure 3, with a tread link mounted therein ready for initial operation thereon.

The machine shown in Figures 3 to 10, both inclusive, includes a main frame indicated at 20 having a horizontal bed plate 21, upright legs or supports 22, 22 and a motor supporting shelf 23 connected between said legs and spaced below the bed plate 21. The bed plate has a rectangular opening 24 adjacent the rear of the machine within which is mounted a pair of laterally spaced gear wheels 25, 25 fixed on the inner ends of shafts 26, 26, respectively. Said shafts are journalled in bearing supports 27, 27 mounted on the bed plate 21 at opposite sides of the opening 24, and in mutual alignment with each other, so that said gear wheels 25, 25 rotate on a common horizontal axis. On the inner opposed faces of each of the gear wheels 25, 25 is mounted a U-shaped holding member 28 each having its closed end arranged concentrically with the axis of rotation of its respective gear 25 and with its open end extending radially of the latter (see Figure 5). Said U-shaped holding members are of such size as to receive the opposite projecting ends of the pivot pins 15, 15 of a tread block 10 in sliding engagement therein, with one of said pivot pins disposed in concentric relation with the gears 25, 25, while the other pivot pin is supported in the U-shaped holding members in off-centered, radial relation with said gears.

A pair of locking pins 29, 29 are slidably mounted in each face of the gears 25, 25 at the outer or open end of each holding member 28 so as to be projected into engagement with the outer off-centered pivot pin 15 when the tread block is mounted in said holding member as indicated in Figure 10. Each of said locking pins 29, 29 is normally urged into locking position by a coil spring 30 contained in a suitable housing 31 on the exterior of its respective gear 25. Means are also provided for automatically withdrawing said locking pins from their locking position at a predetermined angle of rotation of the gears. As shown herein, said means consists of an L-shaped tripper arm 32 having its outer end adapted to engage in a cam-like slot 34 formed in an upwardly projecting bracket 35 mounted on the bed plate 21 at the outer side of each of the gears 25. The purpose and operation of the locking pins 29, 29 and their withdrawing means will hereinafter more fully appear.

The two gears 25, 25 are rotated simultaneously by pinions 36, 36 fixed on a common drive shaft 37 having suitable bearing in pillow blocks 38, 38 below the bed plate 21. The shaft 37 has a worm gear 39 fixed thereon driven by worm 40 on shaft 41, which is suitably coupled to the armature shaft 42 of an electric motor 43. The electric motor is of the usual reversible type so that the gears 25, 25 may be driven in opposite directions, as will hereinafter more fully appear.

The cutting device for scarfing or removing the rubber from the tread links includes a knife member 45 which is formed with an arcuate front face 46 terminating in lower and upper cutting edges or blades 47 and 48, respectively. Each of said blades is of substantially the same length as the tubular members 11, 11 which are to be operated upon (see Figures 6, 7 and 8). The knife has pins 49, 49 at opposite ends thereof, pivotally connected to rearwardly projecting arms 50, 50 of a ram member indicated generally at 51. Said ram member with its arms 50, 50 is mounted for horizontal slidable movement between suitable guides 52, 52 mounted on the bed plate 21, so that the knife 45 may be moved forwardly or rearwardly in the general direction of the axis of rotation of the gears 25, 25. The ram member 51 also includes a horizontal cross bar 53 connecting the front ends of arms 50, 50 and adapted to engage threaded adjusting screw 55 in a suitable stop 54 fixedly supported on the bed plate 21 so that said screw may be engaged by the cross bar 53 to limit the movement of the cutting knife 45 toward the work.

The ram member 51 is movable by power which, as shown herein, is supplied by a double acting hydraulic cylinder 56 supported horizontally on a bracket 57 at the front end of the bed plate 21, and having its piston 58 connected to the cross bar 53 of said ram. The hydraulic cylinder 56 may be supplied by fluid, controlled by suitable valve operating devices such as foot pedals 59 and 60 which may be operated alternately in the usual manner to cause the ram to move either forwardly or rearwardly under hydraulic power as desired.

Hydraulic means are also provided for shifting the operative position of the knife 45 so as to present the blades 47 and 48 alternately toward the work when necessary, as will hereinafter more fully appear. Said hydraulic blade-shifting means herein consists of a double acting upright cylinder 62 mounted on trunnion bearings 63, 63 depending from the bed plate 21. Said cylinder has a piston 64 engaged with a lever 65 extending forwardly from the knife 45, so that said knife may be rocked upwardly or downwardly into either one of two operating positions. The valve control devices for the double acting cylinder 62 may be of any suitable kind well known to those familiar with the art, so are not shown herein in detail.

The operation of the machine may now be described as follows:

The starting position of gears 25, 25 is substantially as shown in Figure 7, wherein the U-shaped holding members 28, 28 are inclined slightly toward the front of the machine, and the tripper arms 32, 32 are disposed at the forward ends of their cam slots 34, 34 so that the locking pins 29, 29 are moved outwardly from the upper ends of said holding members. In this position a tread link 10 is mounted for rotation by said gears by engaging the opposite projecting ends of the pivot pins 15, 15 in the holding members 28, 28. The lower tubular frame member 11 will thus become centered with respect to said gears. The ram 51 with knife 45 are withdrawn forwardly until the tread link is in place between the gears, whereupon the ram is advanced toward the tread link under pressure from the hydraulic cylinder 56. The piston 64 is retracted by hydraulic pressure in cylinder 62 so as to position said knife with its lower blade 47 disposed at a cutting angle toward the adjacent end of the tread link so as to engage the tread surface along a line opposite the lower, or centered tubular member 11 where the rubber covering is thinnest, substantially as shown in Figure 7. The motor 43 is then started so as to rotate the tread link in a clockwise direction, as seen in Figure 7. Hydraulic pressure applied from cylinder 56 causes the knife blade 47 to cut immediately through the relatively thin rubber covering into direct scraping or scarfing contact with the surface of the centered tubular member.

It will be observed that as soon as the tripping pins 32, 32 move out of the cam slots 34, 34, the locking pins 29, 29 are released so as to be moved inwardly by spring pressure, and close the ends of the holding members 28, 28 to secure the tread link in the latter.

Rotation of the tread link is continued to produce a scarfing cut circumferentially around the outer end of the tubular member, until the link reaches a position substantially as shown in Figure 8, wherein the knife 47 is projected inwardly between the two tubular members 11, 11 to a line substantially in the median plane including the axes of said tubular members. Although the scarf may be extended beyond this median plane, yet it is usually preferable to cut substantially to the median plane and depend upon the upper blade 48 to finish the scarfing cut from the opposite side of the link, as will now be described.

When the lower knife 47 has completed its scarfing cut to the position shown in Figure 8, a switch 66 for reversing the motor 43 is suitably arranged for automatic operation at this point, as herein shown said switch being engaged by one of the tripping arms 32, causing the gears 25, 25 to rotate in a counterclockwise direction. At a suitable time after the link has been rotated in such reversed direction (say about 90° from the position shown in Figure 8) the hydraulic piston 64 is actuated to rock the knife 45 so that the upper blade 48 is moved into scarfing engagement with the adjacent surface of the tubular member 11 in the area which has previously been scarfed by the lower blade 47, as shown in Figure 9. It will be observed in the latter figure that the arcuate portion of rubber already severed from the tubular member is held away from the latter by the lower blade 47 so that said severed portion cannot interfere with the scarfing by the upper blade.

Continued rotation of the link from the position shown in Figure 9 will complete the scarfing cut circumferentially around the previously uncut side of the tubular member, until the tread link returns to its starting position, substantially the same as in Figure 7. At this point, an automatic stop switch 67 may be actuated, as by engagement by one of the tripping arms 32. As in the case of lower blade 47, the arrangement is such that the upper blade 48 may cut substantially to the median plane including the axes of the two tubular members 11, 11, so as to form a substantially complete cut around the first tubular member.

It will be understood that the gears 25, 25 can be started for each scarfing operation by means of a suitable manually controlled starting switch of the push-button type, herein indicated at 70, which may be arranged to shortcircuit the stopping switches 66 and 67 in the usual manner.

The scarfing operation just described may then be repeated on the second tubular member 11 of the same link in the same manner. It is preferable, however, that said link be reversed end to end when it is removed and replaced in the holding members 28, 28, so that when the second tubular member is centered with the gears 25, 25 the lower blade 47 will make its initial cut on the same side or tread surface of the link as it did with the first tubular member. As a result the parting lines or cuts opening to both tubular members will be located along the same tread surface of the link, as indicated at 68 and 69 in Figure 2, so as to facilitate the final removal of the severed block. This may now be readily accomplished in any suitable manner, for instance, by engaging the area 71 between the two lines of cuts by a suitable punch or similar device, whereby the rubber block can be removed from between the tubular members.

Although I have shown and described certain embodiments of my invention, it will be understood that I do not wish to be limited to the exact construction shown and described, but that various changes and modifications may be made without departing from the spirit and scope of my invention as defined in the appended claims.

I claim as my invention:

1. In a scarfing machine for stripping a rubber block from a rectangular metal frame of a tread link or the like having two spaced parallel cylindrical members between and around which said rubber block is molded, said machine including a reversibly driven rotating member adapted to hold said frame with one of the cylindrical members thereof centered on said holding member, knife means movable by power radially of said rotating member, and means for adjusting said knife means into alternative scarfing angles relative to said centered cylindrical member when the latter is rotated in opposite directions.

2. In a scarfing machine for stripping a rubber block from a rectangular metal frame of a tread link or the like having two spaced parallel cylindrical members between and around which said rubber block is molded, said machine including a rotating member for holding a tread link with one of its cylindrical frame members in centered position therein, means for driving said holding member reversibly, a knife support guided for movement by power radially of said holding member and having knife means thereon, and means for shifting said knife means into scarfing position relative to said centered cylindrical member in each direction of rotation of the latter.

3. In a scarfing machine for stripping a rubber block from a rectangular metal frame of a tread link or the like having two spaced parallel cylindrical members between and around which said rubber block is molded, said machine including a rotating member for holding a tread link with one of its cylindrical frame members in centered position therein, means for driving said holding member reversibly, a knife support guided for movement by power radially of said clutch member and having knife means thereon, means for shifting said knife means into scarfing position relative to said centered cylindrical member in each direction of rotation of the latter, and stop means for limiting the rotation of said holding member in either direction when said knife means has cut to predetermined points between the two cylindrical members of said link.

4. In a scarfing machine for stripping a rubber block from a rectangular metal frame of a tread link or the like having two spaced parallel cylindrical members between and around which said rubber block is molded, said machine including a rotating member for holding a tread link with one of its cylindrical frame members in centered position therein, means for driving said holding member reversibly, a knife support guided for movement by power radially of said holding member and having knife means thereon, means for shifting said knife means into scarfing position relative to said centered cylindrical member in each direction of rotation of the latter, means for automatically reversing the rotation of said holding member when said knife means has cut to a predetermined point between the two cylindrical members after scarfing in one direction, and means for automatically stopping the rotation of said holding member when it has cut in the opposite direction to a predetermined point between the two cylindrical members.

5. In a scarfing machine for stripping a rubber block from a rectangular metal frame of a tread link or the like having two spaced parallel cylindrical members between and around which said rubber block is molded, said machine including a rotating member for holding a tread link with one of its cylindrical frame members in centered position therein, means for driving said holding member reversibly, a knife support guided for movement by power radially of said holding member and having knife means rockably mounted thereon, and means for rocking said knife means into scarfing position relative to said centered cylindrical member in each direction of rotation of the latter.

6. In a scarfing machine for stripping a rubber block from a rectangular metal frame of a tread link or the like having two spaced parallel cylindrical members between and around which said rubber block is molded, said machine including a rotating member for holding a tread link with one of its cylindrical frame members in centered position therein, means for driving said holding member reversibly, a knife support guided for movement by power radially of said holding member and having double bladed knife means thereon, and means for selectively shifting the two blades of said knife means into scarfing position relative to said centered cylindrical member in each direction of rotation of the latter.

7. In a scarfing machine for stripping a rubber block from a rectangular metal frame of a tread link or the like having two spaced parallel cylindrical members between and around which said rubber block is molded, said machine including a rotating member for holding a tread link with one of its cylindrical frame members in centered position therein, means for driving said holding member reversibly, a knife support guided for movement by power radially of said holding member, a two bladed knife member rockably mounted on said knife support and extending transversely of the direction of movement of the latter, and means for rocking said knife member so that one blade will be moved into scarfing position relative to said centered cylindrical member in one direction of rotation of the latter, and the other blade will be moved into scarfing position relative to said cylindrical member in the reverse direction of rotation of the latter.

8. In a scarfing machine for stripping a rubber block from a rectangular metal frame of a tread link or the like having two spaced parallel cylindrical members between and round which said rubber block is molded, said machine including a rotating member for holding a tread link with one of its cylindrical frame members in centered position therein, means for driving said holding member reversibly, a knife support guided for movement by power radially of said holding member, a two bladed knife member rockably mounted on said knife support and extending transversely of the latter, and means for rocking said knife member so that one blade will be moved into scarfing position relative to said centered cylindrical member in one direction of rotation of the latter, and the other blade will be moved into scarfing position relative to said cylindrical member in the reverse direction of rotation of the latter, and stop means for limiting the rotation of said holding member in its respective directions of rotation when one or the other of said blades reach predetermined points between the two cylindrical members of said link.

9. In a scarfing machine for stripping a rubber block from a rectangular metal frame of a tread link or the like having two spaced parallel cylindrical members between and around which said rubber block is molded, said machine including a reversibly driven rotating member adapted to hold said frame with one of the cylindrical members thereof centered on said holding member, a ram movable radially of said rotating member, knives mounted on said ram, and power-operated means carried with said ram for moving said knives alternatively into scarfing position relative to said centered cylindrical member when the latter is rotated in opposite directions.

10. In a scarfing machine for stripping a rubber block from a rectangular metal frame of a tread link or the like having two spaced parallel cylindrical members between and around which said rubber block is molded, said machine including a reversibly driven rotating member adapted to hold said frame with one of the cylindrical members thereof centered on said holding member, a ram movable radially of said rotating member, knives mounted on said ram, power-operated means carried with said ram for moving said knives alternatively into scarfing position relative to said centered cylindrical member when the latter is rotated in opposite directions, and stop means for limiting the rotation of said holding member in either direction when said knives have cut to predetermined points between the two cylindrical members of said link.

11. In a scarfing machine for stripping a rubber block from a rectangular metal frame of a tread link or the like having two spaced parallel cylindrical members between and around which said rubber block is molded, said machine including a reversibly driven rotating member adapted to hold said frame with one of the cylindrical members thereof centered on said holding member, a ram movable radially of said rotating member, knives mounted on said ram, power-operated means carried with said ram for moving said knives alternatively into scarfing position relative to said centered cylindrical member when the latter is rotated in opposite directions, means for automatically reversing the rotation of said holding member when one of said knives has cut to a predetermined point between the two cylindrical members after scarfing in one direction, and means for automatically stopping the rotation of said holding member when the other knife has cut in the opposite direction to a predetermined point between the two cylindrical members.

12. In a scarfing machine for stripping a rubber block from a rectangular metal frame of a tread link or the like having two spaced parallel cylindrical members between and around which said rubber block is molded, said machine including a rotating member for holding a tread link with one of its cylindrical frame members in centered position therein, means for driving said holding member reversibly, a knife support guided for movement by power radially of said holding member and having knife means thereon, means for shifting said knife means into scarfing position relative to said centered cylindrical member in each direction of rotation of the latter, means for automatically reversing the rotation of said holding member when said knife means has cut to a predetermined point between the two cylindrical members after scarfing in one direction, means for automatically stopping the rotation of said holding member when it has cut in the opposite direction to a predetermined point between the two cylindrical members, and means for automatically locking said tread link in said holding member while the latter is being rotated, and releasible when the latter is in its automatically stopping position.

CLAYTON O. DOHRENWEND.